Jan. 26, 1926.
J. HARRIS
BLOWPIPE
Filed Jan. 19, 1921
1,571,004
2 Sheets-Sheet 1
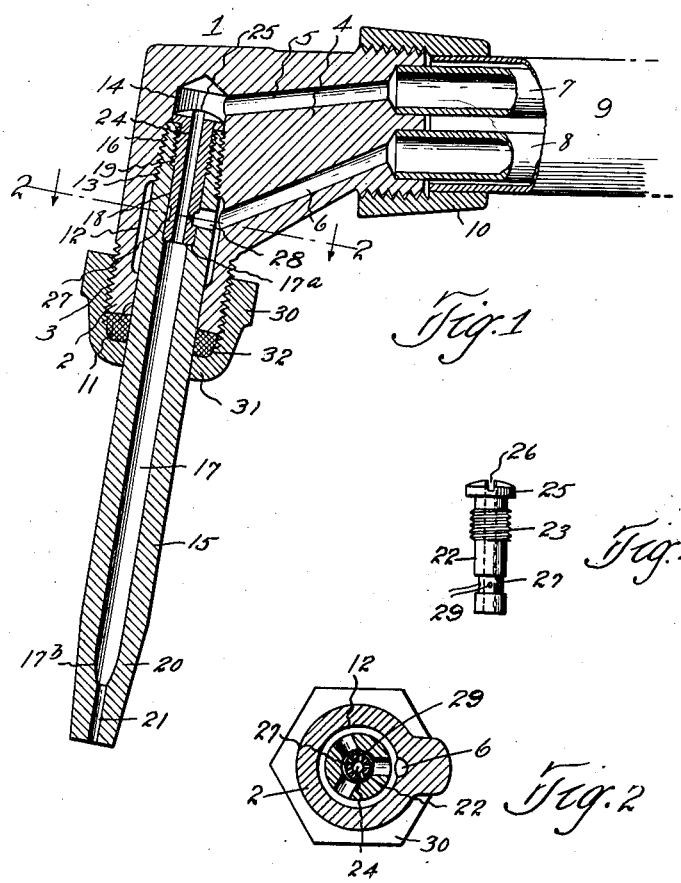
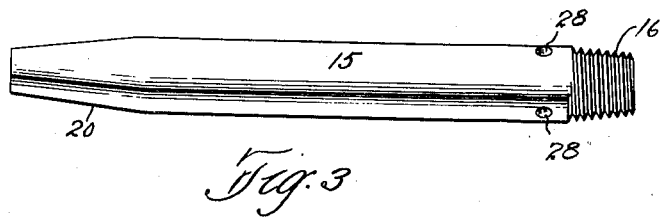
Inventor
John Harris
By Hull, Buck & West
Attys.

Jan. 26, 1926.
J. HARRIS
BLOWPIPE
Filed Jan. 19, 1921    2 Sheets-Sheet 2
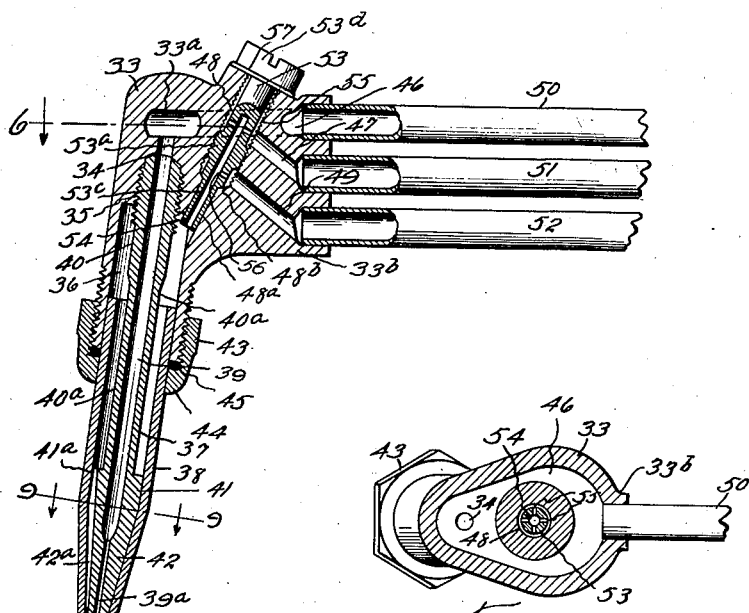
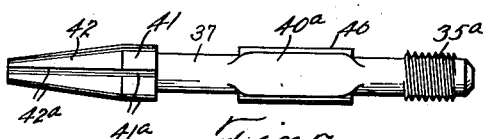
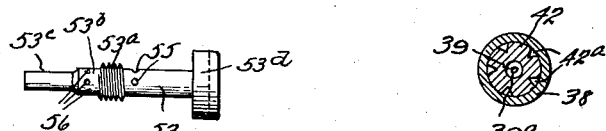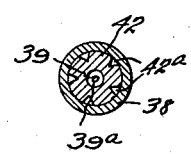
Inventor
John Harris
By Hull, Buck & West
Attys.

Patented Jan. 26, 1926.

1,571,004

UNITED STATES PATENT OFFICE.

JOHN HARRIS, OF LAKEWOOD, OHIO.

BLOWPIPE.

Application filed January 19, 1921. Serial No. 438,287.

*To all whom it may concern:*

Be it known that I, JOHN HARRIS, a citizen of the United States, residing at Lakewood, in the county of Cuyahoga and State of Ohio, have invented a certain new and useful Improvement in Blowpipes, of which the following is a full, clear, and exact description, reference being had to the accompanying drawings.

This invention relates to blowpipes or torches, such as are employed in the art of welding and cutting metals by gases. It is the general object of the invention to provide a construction which will not only enable the pipe to be employed with gases under low pressures without detrimental "back-firing"; but also to provide a construction wherein, should the flame be propagated to the interior of the pipe, the flame will be immediately blown out, thereby preventing injury to the pipe through the maintenance of a flame therewithin as well as preventing injury to the connections leading to the pipe proper through the propagation of a flame within such connections.

In the welding of metal by blowpipes operating with high pressure gases, the liquid metal is liable to be blown out of the joint by the high velocity of the flame and gases at the end of the reducing flame. By the use of my invention I am enabled to use gases under low pressure in welding blowpipes, enabling me to produce a smooth weld and without blowing the liquid metal from the joint.

I secure the foregoing objects in and through the constructions illustrated in the drawings forming part hereof wherein Fig. 1 represents a central longitudinal sectional view through the head and tip of a welding pipe constructed in accordance with my invention; Fig. 2 a sectional detail corresponding to the line 2—2 of Fig. 1; Fig. 3 an elevation of the tip member of the blowpipe; Fig. 4 a detail in elevation of mixing device employed in such tip; Fig. 5 a view, similar to Fig. 1, of a cutting torch embodying my invention; Fig. 6 a sectional detail corresponding to the line 6—6 of Fig. 5; Fig. 7 an elevation of the inner member of the tip of such cutting torch; Fig. 8 an elevation of the mixing device; and Fig. 9 a sectional detail corresponding to the line 9—9 of Fig. 5.

Describing the parts by reference characters and with special reference to Figs. 1 to 4 inclusive, 1 denotes generally the blowpipe head, said head being conveniently formed of a casting terminating in a downwardly extending cylindrical portion 2 having its lower end provided with an external thread 3, the cylindrical portion 2 being carried by a lateral extension 4 having a passageway 5 for oxygen and a passageway 6 for acetylene or other combustible gas, the passageway 5 communicating with an oxygen supply pipe 7, the passageway 6 with a combustible gas supply pipe 8, the said pipes being indicated as covered by a handle casing 9 which may be secured to the lateral portion 4 of the head as by a gland nut 10.

The head 1 is provided with a vertical bore extending upwardly from the lower end thereof. The lower portion 11 of said bore extends upwardly from the bottom of the head proper to an enlargement 12. From the upper portion of such enlargement, the bore is reduced and upwardly tapered and provided with a thread, as shown at 13, the last mentioned portion of the bore merging with a chamber 14 adjacent to the top of the head and with which chamber the passageway 5 communicates.

A tip 15 is threaded into the portion 13 of the bore, being provided with a tapered externally threaded portion 16 for this purpose. From the bottom of the threaded portion 16, the tip is cylindrical and of a diameter to fit more or less closely the lower portion 11 of the head bore, the enlarged portion 12 of the bore providing an annular chamber about the tip with which the passageway 6 communicates. The tip is preferably made from a piece of copper tubing having a central bore 17 of about ⅛ inch in diameter, said bore being enlarged near the upper end of the tip, as indicated at 18, the upper end of such enlargement being internally threaded, as shown at 19, and a ledge or shoulder 17ª being provided between the portions 17 and 18 of the bore. The lower end of the tube is swaged inwardly, as shown at 20. In practice, the swaging of the lower end of the tube will not only gradually reduce the bore, as indicated at 17ᵇ, but will completely close the lower end of the same. After such closing, the lower end of the tip is drilled, as indicated at 21, to provide a discharge orifice of the proper size, that made by a No. 51 drill having proven efficient.

In the enlarged portions 18 and 19 of the bore there is mounted a mixing device 22, said mixing device having an external thread 23 by means of which it is detachably fitted into the upper portion 19 of the bore, the outer portion 22 of said mixing device, below the thread 23, preferably forming a close fit with the bore section 18, the lower end of the mixing device being seated on the shoulder 17ª. The mixing device is provided with a central bore 24 which is preferably of the same diameter as the outlet 21, the upper end of the mixing device being provided with a head 25 adapted to seat on top of the tip and provided with a slot 26 for the reception of a screw driver or other suitable tool.

At a short distance above its bottom, the mixing device 22 is provided with an annular recess 27, said recess providing with the adjacent wall of the bore 18 a distributing chamber through which combustible gas supplied to the chamber 12 may be conducted through ports 28 in the tip 15 and ports 29 in the mixing device to the bore 24. The cross-sectional area of the ports 29 is much smaller than that of the passageway 21 and bore 24; I have shown five passageways 29 and each will be preferably less than 1/5 of the cross-sectional area of the passageway 24.

The tip 15 is centered with respect to the head by means of a gland nut 30 threaded upon the lower end of the head and having a flange 31 at the bottom adapted to engage the tip, the space enclosed by said flange, the bottom of the head, and the enclosed wall of the tip being provided with a packing 32 which will prevent the leakage of any gas from the chamber 12.

With the parts constructed and arranged as described, oxygen admitted through the pipe 7 and the passageway 5 will enter the central bore or passageway 24 of the mixing device. The combustible gas will also be admitted to said bore or passageway through the passageway 6, chamber 12, ports 28, chamber 27 and ports 29, the last mentioned ports being preferably inclined downwardly toward the lower end of the bore 24. A detonating mixture of oxygen with the combustible gas will be formed between the delivery ends of the ports 29 and the bottom of the bore 24 and will be discharged into the expansion chamber 17 provided between the bottom of the mixing device and the burner orifice 21.

Because of the construction and arrangement of the parts it has been found possible to operate the torch or blowpipe under a very low pressure of gases, with substantially no liability of the flame being propagated into the chamber 17. This is believed to be due to the fact that, because of the manner of supplying the gases to the expansion chamber 17 in the tip, there is a substantially even pressure throughout the extent of said chamber with no tendency to the production of a vacuum therein. Furthermore, should the flame be propagated into the expansion chamber, as may sometimes occur, the mixture therein will immediately explode and the flame will be immediately extinguished by being blown out of said chamber by such explosion through the orifice 21, due to the fact that this orifice provides a path of least resistance for the explosive wave produced by this action. It is therefore impossible for a flame to be maintained within the chamber 17, so that it is equally impossible for any injury to be done to the interior of the tip through such flame. Furthermore, because of the restricted area of the ports 29, no flame can be propagated through these ports into the chamber 12, or in fact into any part of the conduit for supplying combustible gas to the tip.

In Figs. 5 to 9 inclusive there is shown the manner in which my invention may be employed in connection with a cutting torch. This torch is shown as provided with a head 33 provided with a chamber 33ª in the upper portion thereof, said chamber communicating with a vertical passageway 34 which merges with an internally threaded bore 35, the lower end of said bore in turn merging with a cylindrical chamber 36 which extends to the bottom of the head.

A tip comprising an inner member 37 and an outer member 38, preferably pinned together, is connected to the head, the inner member being provided with a central bore 39 adapted to register with and form a continuation of the passageway 34, the lower or delivery end of said bore being contracted by swaging the tubing of which the inner member is composed, after which the tubing is drilled to provide a centrally restricted jet orifice 39ª. The upper end of the inner tip member is provided with a thread, whereby it may be detachably connected to the head through the threads 35.

Below the threaded portion 35ª, the inner tip member is slightly reduced in cross-section and, beneath this reduced portion, is provided with an upper cylindrical enlargement 40. Below the lower end of such enlargement, the said member is provided with a short cylindrical enlargement 41 merging at its lower end with a frusto-conical surface 42. The portions 40, 41 and 42 are adapted to fit snugly within the outer tip member, the projections or enlargements providing means for centering the inner member within the outer member as well as means whereby passageways may be provided for the mixture of preheating gases conducted to the delivery end of the pipe.

Opposite sides of the enlargement 40 are cut away, as shown at 40ª whereby passageways will be provided on opposite sides of such enlargement and between the same and the outer tip member.

The enlargement 41 and the frusto-conical projection 42 are provided with triangular slots 41ª and 42ª, respectively, providing, with the surrounding outer tip member, triangular passageways and an outlet for the preheating gases. The tip as a whole will be centered with respect to the lower end of the head and a gas-tight joint provided between the outer tip member and the head by means of a gland nut 43 which is threaded onto the lower end of the head and provided with a flange 44 adapted to fit the outer surface of the outer tip member, there being packing 45 interposed between said flange and the lower end of the head.

The blowpipe head is provided with a lateral extension 33ᵇ having a branched passageway 46 communicating with the chamber 33ª, a passageway 47 extending to an annular chamber provided by a downwardly inclined bore 48 extending from the top of the lateral branch of the head between the branches of the passageway 46. The lower end of the bore 48 is reduced, as shown at 48ª, the reduced portion of the bore communicating with the upper end of the chamber 36 and a shoulder 48ᵇ being provided between the portions 48 and 48ª of said bore. A third passageway 49 communicates with the enlarged portion 48 of the bore just above the shoulder 48ᵇ. Pipes 50, 51 and 52 respectively conduct oxygen for cutting purposes to the passageway 46, oxygen for preheating purposes to the passageway 47, and acetylene or other combustible gas for preheating purposes to the passageway 49.

Within the bore 48, 48ª, is a mixing device, said mixing device comprising a stem 53 of smaller diameter than the bore 48 and having a threaded enlargement 53ª whereby the injector may be applied to and removed from the bore 48 which is internally threaded for this purpose. Beneath the enlargement 53ª, the mixing device stem is reduced, as shown at 53ᵇ, and is further reduced, as shown at 53ᶜ, the lower reduced portion forming a close fit with the bore 48ª. The mixing device is provided with a central bore 54 extending upwardly from the lower end thereof as far as a series of radial ports 55 which communicate with the chamber provided above the threaded extension or enlargement 53ª. Similar radial ports 56 are provided in the portion 53ᵇ, whereby the central bore of the mixing device is placed in communication with the chamber surrounding such portion 53ᵇ and with which the passageway 49 communicates. In order to form a leak-proof joint between the head 53ᵈ of the mixing device and the head of the blowpipe, a packing washer 57 is applied to said stem between the head thereof and a seat on the head of the blowpipe.

The area of the central bore of the mixing device in this case is less than the aggregate area of the passageways 41ª or 42ª and of the outlet for the expansion chamber provided by the lower or discharge ends of the passageways 42ª, while the cross-sectional area of the radial ports of the mixing device is considerably less than the cross-sectional area of the central bore, each of the radial ports 56 being preferably not greater than ⅓ to ¼ the area of the central bore.

In the operation of a cutting torch constructed in the manner described, oxygen for cutting purposes is admitted to the bore 39 of the inner tip member through pipe 50, passageway 46 and chamber 33ª. Oxygen for preheating purposes is admitted through the pipe 51, passageway 47 and the radial ports 55 to the central bore of the mixing device and, passing along said bore, meets the combustible gas supplied through the ports 56 from passageway 49 and pipe 52, and the explosive or detonating mixture produced within the mixing device is discharged into the expansion chamber 36, whence it is delivered to the preheating outlets 42ª.

As in the case with the welding pipe or torch, should the flame be propagated into the expansion chamber within the tip, the detonation or explosion of the mixture in said chamber will result in immediately blowing the gases and the flame out of said chamber through the outlet orifices of the tip, the said orifices offering a path of least resistance for the explosive wave. The smallness of the radial ports 55 and 56 absolutely prevents any flame from being propagated therethrough and into the chambers surrounding the mixing device and the passageways and connections communicating with said chambers. Furthermore, owing to the shape of the expansion chamber and the arrangement of the mixing device with respect thereto, there will be no tendency to a vacuum or a partial vacuum within the expansion chamber; hence the liability of propagation of flame into such chamber is reduced to a minimum.

The general construction of the inner tip member of the cutting blowpipe, including the passageways for preheating gases formed between said member and the outer member, is shown here as substantially identical with the construction of the corresponding parts in my application No. 225,431 filed March 29, 1918, wherein the details of such construction are claimed.

Having thus described my invention, what I claim is:

1. In a blowpipe, the combination of a head, a tip member secured to said head and provided with an expansion chamber having one or more burner outlets below and communicating therewith, a mixing device additional to said tip member and arranged to discharge its contents into said chamber, means for supplying oxygen to the bore of said mixing device, there being restricted ports extending through the wall of the mixing device from said bore, and means for supplying a combustible gas through said head and through said ports into the bore of said mixing device, the cross-sectional area of the outlet or outlets being at least as great as the cross-sectional area of the mixing device bore and at least as great as the aggregate cross-sectional areas of the ports for combustible gas communicating with said bore.

2. In a blowpipe, the combination of a head, a tip member secured to said head and provided with an expansion chamber having one or more burner outlets therebelow and communicating therewith, and a mixing device additional to said tip member and having a bore arranged to discharge into the upper end of said chamber, there being an annular chamber in said head surrounding the said mixing device above the lower end thereof and a plurality of restricted ports extending through the wall of said mixing device and placing the annular chamber in communication with the bore thereof, said head having a passageway for combustible gas communicating with said annular chamber and a second passageway for oxygen arranged to discharge into the bore of the mixing device above the said annular chamber.

3. In a blowpipe, the combination of a head, a tip member secured to said head and provided with an expansion chamber having a burner outlet therebelow and communicating therewith, a mixing device additional to said tip member, and means in said head for supplying oxygen and a combustible gas to said device to produce an explosive mixture therein, the delivery end of said device being arranged to discharge such mixture into the upper portion of said chamber, the mixing device bore and the discharge outlet being so proportioned that a path of least resistance is provided for an explosive wave from within said chamber through said outlet.

4. In a blowpipe, the combination of a tip comprising an inner and an outer member, the inner member being provided with a discharge outlet and an enlarged bore extending thereabove, there being a plurality of restricted discharge outlets surrounding the first mentioned outlet and communicating at their upper ends with an expansion chamber provided between the inner and the outer tip members, a blowpipe head having a central bore providing an upper extension of said expansion chamber, means detachably connecting said tip to said bore, said head having a passageway for supplying cutting oxygen to the bore of the inner tip member and an inclined bore communicating with the upper end of the expansion chamber, and a mixing device mounted in said inclined bore, said mixing device having longitudinally spaced series of restricted ports extending outwardly from the bore thereof and each series communicating with a chamber provided between the mixing device and the bore wherein it is mounted, said head having a passageway for oxygen communicating with one of the two last mentioned chambers and a passageway for combustible gas communicating with the other of said last mentioned chambers.

5. In a cutting torch, the combination of a head having an expansion chamber, a tip having a plurality of discharge outlets for preheating gases communicating with said expansion chamber and a central orifice for cutting oxygen, means for supplying cutting oxygen to such central orifice, a mixing device adapted to discharge into the upper end of the expansion chamber and having two longitudinally spaced series of restricted ports extending outwardly from the bore and through the wall thereof, means for supplying oxygen to one of such series of ports, and means for supplying a combustible gas to the other series of ports, the aggregate area of the tip outlets for preheating gases being at least as great as the cross-sectional area of the bore of the mixing device.

In testimony whereof, I hereunto affix my signature.

JOHN HARRIS.